Aug. 16, 1960 L. E. EGEDAL 2,949,284
STIRRING WHIPS
Filed July 29, 1957
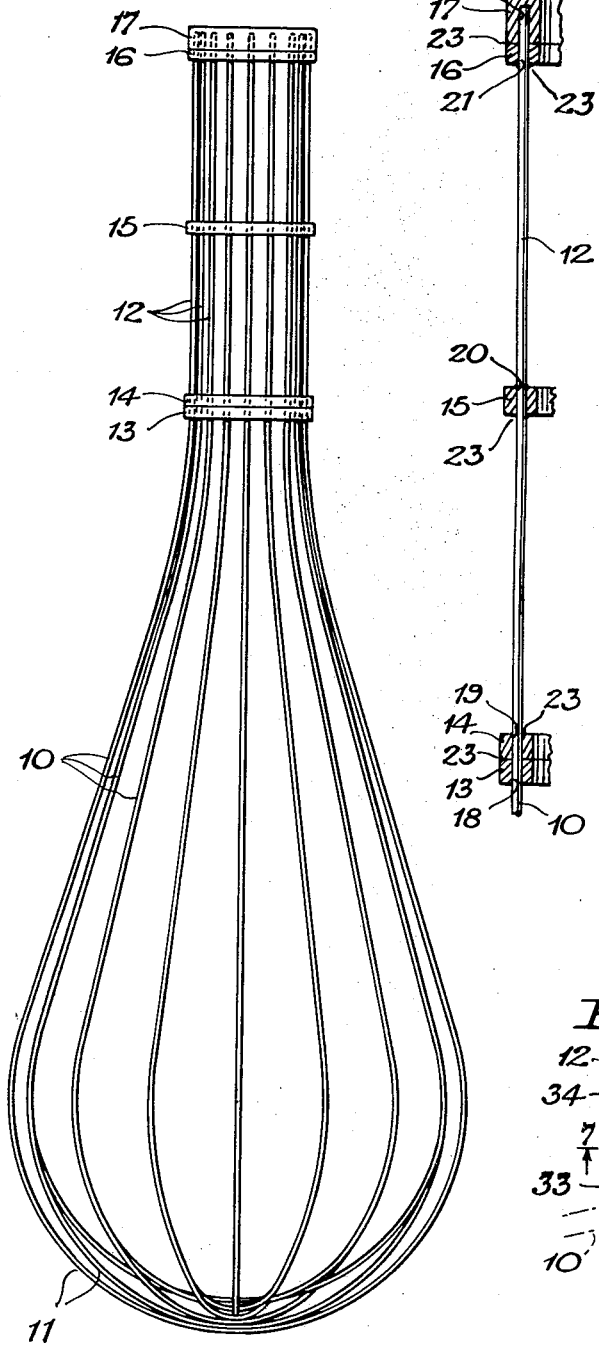
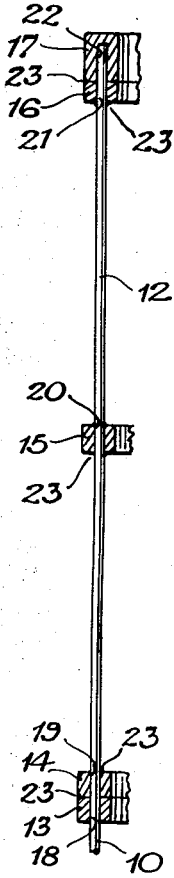
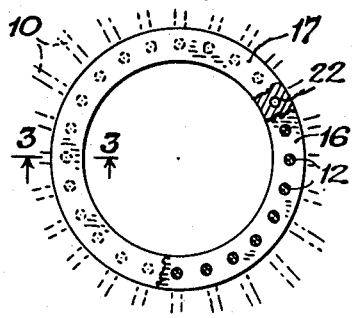
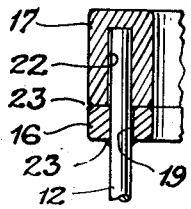
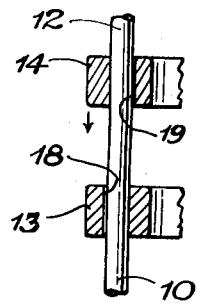
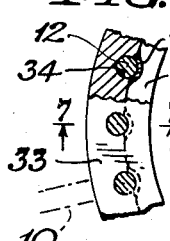
INVENTOR.
LAWRENCE E. EGEDAL
BY
Christopher L. Waal
ATTORNEY

United States Patent Office 2,949,284
Patented Aug. 16, 1960

2,949,284

STIRRING WHIPS

Lawrence E. Egedal, 2580 N. Frederick Ave., Milwaukee 11, Wis.

Filed July 29, 1957, Ser. No. 674,650

1 Claim. (Cl. 259—144)

The present invention relates to utensils such as stirring whips and the like, and to handle structures therefor.

An object of the invention is to provide an improved handle, such as for a stirring whip adapted for culinary use, the handle being of strong, light-weight and inexpensive construction, and capable of being firmly grasped and easily cleaned.

Another object is to provide a handle including easily applied retaining means for holding longitudinally extending wires of the handle in spaced relation to present a gripping surface.

Still another object is to provide a wire-type stirring whip in which the wires thereof constitute grip-forming parts of the whip handle.

The invention further consists in the several features hereinafter described and claimed.

In the accompanying drawing,

Fig. 1 is an elevational view of a stirring whip constructed in accordance with the invention;

Fig. 2 is an end view of the whip handle on an enlarged scale, parts being broken away and parts being shown in section;

Fig. 3 is a fragmentary longitudinal sectional view of the whip handle, taken generally on the line 3—3 of Fig. 2;

Fig. 4 is a fragmentary detail sectional view, on a still larger scale, of the end portion of the whip handle, the view being taken in the same plane as Fig. 3;

Fig. 5 is a fragmentary longitudinal sectional view showing parts of the whip handle during the assembling operation; the view being on the same scale as Fig. 4 and in the same plane as Fig. 4;

Fig. 6 is a fragmentary transverse sectional view of a modified form of whip handle, the view being on the same scale as Fig. 4, and Fig. 7 is a fragmentary detail sectional view of the whip handle of Fig. 6, taken on the line 7—7 of Fig. 6.

In the drawing, 10 designates a group or cluster of reversely bent resilient wires, such as of music wire steel or stainless steel. The intermediate portions of the wires are in the form of rounded loops 11, and the bent wires are arranged in different angularly related planes, the looped portions of the assembled wires forming a bulbous stirring end of the whip.

The end portions 12 of the wires are parallel and arranged with their axes equally spaced in a cylindrical pattern, the parallel end portions of each reversely bent wire being diametrically opposite, and the several parallel wire portions 12 being positioned and confined by apertured retaining means hereinafter described to form an elongated, cage-like tubular handle of generally cylindrical shape. Any desired securing means may be used to fix the end portions 12 in the apertured retaining means. The specific securing arrangement claimed in divisional application Serial No. 789,942, filed January 29, 1959, is here described. The retaining means is here shown to comprise a plurality of coaxial circular rings or annular members 13, 14, 15, 16, and 17 with rounded edges. The rings 16 and 17 are in axial abutment with each other and are disposed at the outer end of the handle. The rings 13 and 14 are also in axial abutment with each other and are spaced from the outer end of the handle. The ring 15 is an intermediate ring spaced about midway between the rings 14 and 16. The several rings have respective circular series of equally spaced bores 18, 19, 20, 21, and 22 extending parallel to the axes of the rings. The hole circles of the rings 13, 15, and 17 are of the same diameter, while the hole circles of the rings 14 and 16 have a diameter a few thousandths of an inch smaller. The corresponding holes of each pair of the axially abutting rings, being slightly offset in a radial direction, provide a pinching effect on the wires where they pass through these rings. In the endmost ring 17 the bores 22 do not extend completely through the ring and thus form cylindrical pockets for receiving and concealing the cut ends of the wires. The cage-like tubular handle forms therein an axially extending space which is laterally bounded by the wires of the handle and opens endwise of the handle.

In assembling the stirring whip, the apertured retainer rings 13 to 17 are passed in succession over the parallel end portions 12 of the looped wires. The ring 14 is pressed along the wires into abutment with the ring 13, and the end ring 17 is pressed along the wires into abutment with the ring 16, thus pinching the wires and tightly holding or locking the rings in position. Instead of pressing the end ring 17 towards the ring 16, it is usually desirable to employ a reversed procedure in which the ring 16 is pressed towards the end ring 17, since the wires are bottomed in the end ring. Fig. 5 shows the wire-retaining rings 13 and 14 before they are pressed together. The abutting retaining rings are elastically stressed by the wires extending through them, thus providing a firm mutual gripping action on the rings and wires. Preferably, the rings are also bonded to the wires, and the abutting rings are bonded together, by a suitable bonding agent 23, such as tin solder, which seals the crevices. In the case of a whip made of music wire steel and soft steel rings, the assembly is preferably plated with a rust-resistant metal such as nickel, the plating also having a bonding effect and filling crevices. In the case of stainless steel wires the retainer rings may be made of stainless steel or aluminum alloy, and a plating operation is not necessary. A suitable type of bonding agent or adhesive which may be used for the latter assembly is that known as "Loctite," manufactured by The American Sealants Company of Hartford, Connecticut. This is supplied in the form of a thin resinous liquid which will penetrate into small crevices, and which sets to a solid state. In any of the above described constructions where the wires are bonded to the retainer rings, it is possible to use single rings instead of the double rings.

In use, the stirring whip is grasped by its cage-like tubular handle, the spaced wire portions 12 of which present a non-slip gripping surface. The cage-like handle can be easily cleaned, and if desired a cleaning brush can be inserted into the open end of the handle for contact with the wires and rings. The open-ended handle also provides for ventilation of the hand portions grasping the handle.

The modified form of handle construction shown in Figs. 6 and 7 includes axially spaced retainer rings 33, one being shown, each provided with a circular series of parallel bores 34 through which the end portions 12 of the whip wires 10 extend. An annular groove 35, such as of trapezoidal cross-section, is formed in the ring, preferably at the inner side thereof, and intersects the bores 34. The wires are locked to the ring by a suitable bonding agent 36 applied to the wires where they are exposed at the groove 35 and also at the faces of the rings. With this form of construction it is not necessary to provide abutting rings. The handle assembly also includes an apertured end ring, not shown, similar to the end ring 17 of Fig. 9, except that it has an annular groove like the groove 35 of Fig. 7.

The various retainer rings and their hole patterns are preferably of circular shape, as shown, although in some instances they may have other shapes, such as elliptical.

I claim:

In a stirring whip, a plurality of looped wires forming a bulbous stirring end and having generally parallel end portions extending in one direction, a plurality of retainer members distinct from each other and each having a separate aperture in its periphery for receiving each wire end portion, means fixedly securing the wire end portions in the said apertures, said retainer members having a central opening therethrough of sufficient diameter to receive a cleaning brush and being spaced from each other along the wire end portions to define a handle having therein an axially extending space bounded laterally by the wires of the handle through which a cleaning brush can be passed to clean the interior of the handle and the whip.

References Cited in the file of this patent

UNITED STATES PATENTS

| | | |
|---|---|---|
| 565,260 | Cook | Aug. 4, 1896 |
| 1,007,891 | Read | Nov. 7, 1911 |
| 2,634,474 | Grayson | Apr. 14, 1953 |